United States Patent [19]
FitzPatrick

[11] Patent Number: 5,581,739
[45] Date of Patent: Dec. 3, 1996

[54] TWO LANE COMPUTING SYSTEMS

[75] Inventor: Roger S. FitzPatrick, Cheltenham, England

[73] Assignee: Smiths Industries Public Limited Company, London, United Kingdom

[21] Appl. No.: 280,511

[22] Filed: Jul. 26, 1994

Related U.S. Application Data

[63] Continuation of Ser. No. 949,980, Sep. 24, 1992, abandoned.

[30] Foreign Application Priority Data

Oct. 10, 1991 [GB] United Kingdom ................. 9121540

[51] Int. Cl.⁶ ........................... G06F 7/02; G06F 11/14; G06F 11/20
[52] U.S. Cl. .................................. 395/500; 364/DIG. 1; 364/DIG. 2; 364/578; 395/183.09
[58] Field of Search ................................ 395/800, 500, 395/182.02, 182.12, 182.11, 185.17, 183.02, 183.09, 183.08, 183.01; 364/DIG. 1, DIG. 2, 489, 578, 580; 371/22.4, 27, 500

[56] References Cited

U.S. PATENT DOCUMENTS

| | | | |
|---|---|---|---|
| 4,283,720 | 8/1981 | Herledan | 340/653 |
| 4,306,286 | 12/1981 | Cocke et al. | 395/800 |
| 4,370,706 | 1/1983 | Doniger et al. | 364/184 |
| 4,423,594 | 1/1984 | Ellis | 364/149 |
| 4,703,481 | 10/1987 | Fremont | 371/12 |
| 4,725,975 | 2/1988 | Sasaki | 395/500 |
| 4,763,289 | 8/1988 | Barzilai et al. | 371/23 |
| 4,775,976 | 10/1988 | Yokoyama | 395/182.02 |
| 4,967,347 | 10/1990 | Smith et al. | 395/575 |

FOREIGN PATENT DOCUMENTS

| | | |
|---|---|---|
| 0271807 | 6/1988 | European Pat. Off. . |
| 8700316 | 1/1987 | WIPO . |

*Primary Examiner*—Daniel H. Pan
*Attorney, Agent, or Firm*—Pollock, Vande Sande & Priddy

[57] ABSTRACT

A dual lane computing system has at least one processor in each lane, each processor having an associated store which stores input data supplied to the processor and their time of arrival. The lanes produce nominally-identical outputs which are supplied to a comparator that detects when there is a discrepancy between the lanes. When a discrepancy is detected, an external processor is loaded with software that simulates the operation of the lanes. The data in the store associated with one of the lane processors is supplied to the simulator processor in respect of the input just prior to the detection of the discrepancy. The simulator simulates the operation of one lane utilizing this data and its output is compared in the comparator with the actual output of that lane as recorded when the discrepancy occurred.

5 Claims, 5 Drawing Sheets

TWO LANE COMPUTING SYSTEMS

This application is a continuation of Ser. No. 07/949,980, filed on Sep. 24, 1992 now abandoned.

BACKGROUND OF THE INVENTION

This invention relates to computing systems and methods.

It is known in computing systems, the failure of which would be undesirable, to replicate in two or more hardware lanes the processing function to be performed so that each such lane is capable independently of performing the computing system's intended function such that it will continue to operate in the event of one lane failing.

It is also known to compare the outputs of such multi-lane systems in search of discrepancies, the detection of a discrepancy signifying that one lane has failed.

Where only two lanes are installed, which one has failed is indeterminate and the system may no longer be used. Where more than two lanes are installed it is known for a process of majority voting to be employed to identify which is divergent, that lane then being isolated and the system continuing in operation using only those lanes whose outputs are still in agreement.

It is a feature of such computing architectures that they incorporate at least one more operating lane than their function strictly necessitates, that where continued operation is demanded after the discovery of a failure at least two more lanes are required, and that upon discovery of such a failure and disconnection of a failed lane the system's redundancy is reduced by one lane.

BRIEF SUMMARY OF THE INVENTION

It is an object of the present invention to provide an improved computing system and method.

According to the present invention there is provided a computing system including at least two lanes each having at least one processor the lanes being arranged to produce respective, nominally-identical outputs and a detector for detecting a discrepancy between the outputs and signalling a fault, each processor having an associated store that is arranged to store input data supplied to its respective processor, the system including a simulator for simulating the operation of a part at least of one of the lanes on detection of a discrepancy between the lanes, the system supplying the simulator with the contents of the store of one of the lanes which was supplied to its associated processor just prior to the detection of a discrepancy, and the simulator being arranged to simulate the operation of the one lane utilizing the data from the store.

The store may be arranged to store the time of arrival of data supplied to the store. The system may include a software store of software simulating the operation of the lanes, the software store being separate from the simulator and the contents of the software store being loaded into the simulator only on detection of a discrepancy between the two lanes. The system preferably includes a comparator for comparing the output of the simulator with the outputs of the lanes and for disconnecting the lane that is in disagreement with the simulator. The output of the simulator may be used to provide an alternative output of the system. Each lane may include at least two processors, each processor having an associated store that records data input to that processor, the simulator simulating operation of a first of the processors and supplying an output to a second of the processors instead of the output from the first processor on detection of a fault in the first processor. The simulator may be arranged to simulate the operation of the second processor and may perform two simulations of the second processor one of which utilizes the output from the first processor and the other of which utilizes the output produced by simulation of the first processor. The stores associated with the processors may be arranged to re-inject input data to their associated processor if the system should be restarted following an interruption to the system.

According to another aspect of the present invention there is provided a method of monitoring the operation of a computing system of the kind including at least two lanes arranged to produce nominally-identical outputs, the outputs of the lanes being compared and when a discrepancy is detected a simulation of a part at least of the operation of at least one of the lanes being run utilizing recorded input data supplied to that lane just prior to the detection of the discrepancy, and the simulated output being compared with the recorded actual outputs of the lanes in respect of the same input data in order to determine which lane is at fault.

A fault tolerant computing system and its method of operation in accordance with the present invention, will now be described, by way of example, with reference to the accompanying drawings.

DETAILED DESCRIPTION OF THE PREFERRED EMBODIMENTS

Figure 1:
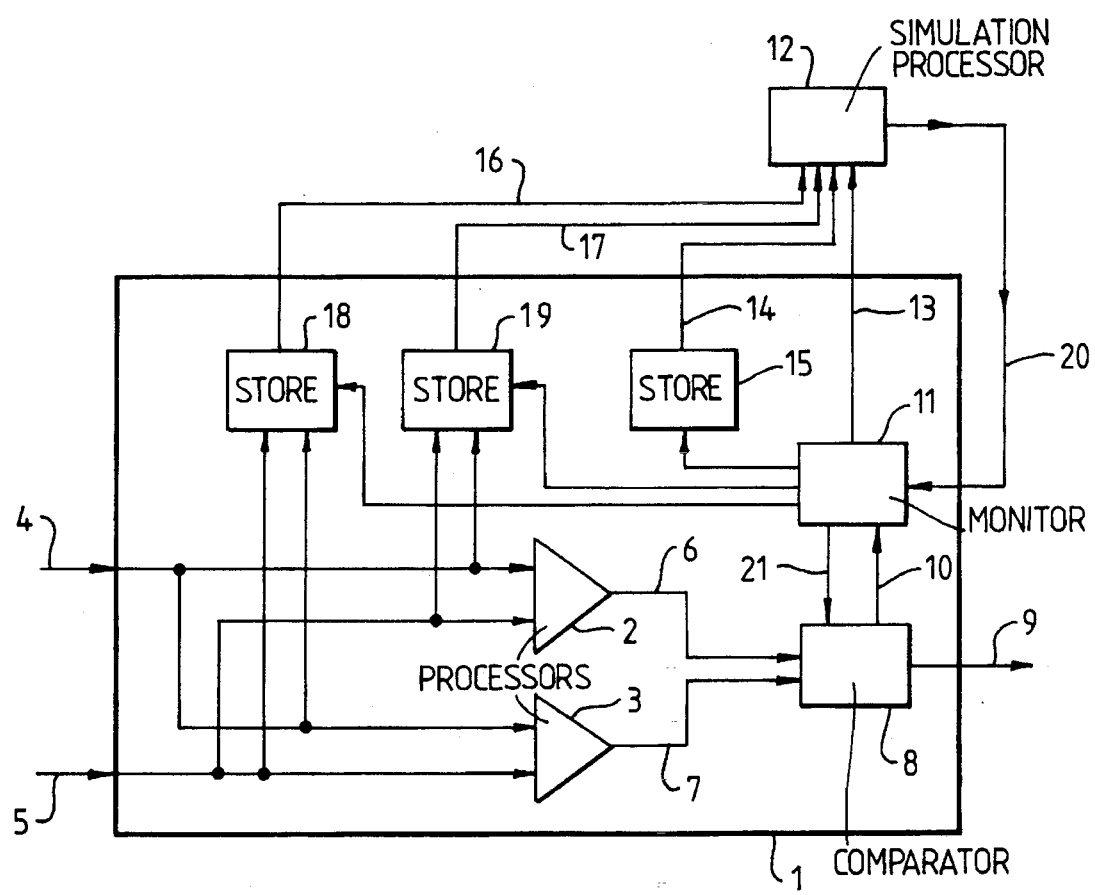
FIG. 1 is a schematic representation of a simplified computing system showing components of the invention.

With reference first to FIG. 1 there is shown a simplified dual-lane computing system delineated by system boundary 1 and comprising processors 2 and 3 each of which receive identical inputs via lines 4 and 5 from sources (not shown) external to the system. The processors 2 and 3 perform identical mathematical processes on the input data to produce nominally-identical outputs via lines 6 and 7. The outputs are compared in comparator 8 and, if found to be in agreement, either of the signals received via lines 6 or 7 is supplied as an output from the system via line 9.

In the event comparator 8 finds a discrepancy between outputs 6 and 7, this fault condition is signalled via line 10 to system executive or monitor 11, which may be a component of the computing system or may be external to it. The monitor 11 also commands the processor 12 via line 13 to receive via lines 16 and 17 from two memories or stores 18 and 19 the data which was entering the processors 2 and 3 at the moment the discrepancy arose, that is, just prior to detection of the discrepancy. In this respect, the stores 18 and 19 contain information as to the time that data was received by the associated processor 2 and 3 respectively. The processor 12 is loaded via line 14 with a program in store 14 and caused to run a simulation of the computing systems for the purpose of identifying what should have been its correct output.

The correct output calculated by the simulation processor 12 is communicated via line 20 to the monitor 11 which is thence able, by comparison with system outputs 6 and 7, to identify which lane 4 or 5 of the computing system was at fault. The monitor allows continued computing using the other lanes and issues commands via line 21 to the comparator 8 to ignore the faulty lane.

Figure 2A:
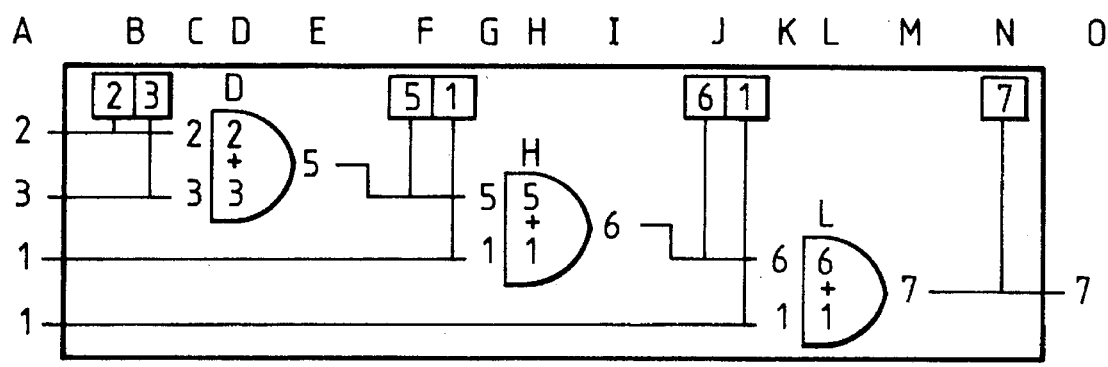
FIGS. 2(a), 2(b) and 2(c) schematic representations of one lane of the computing system showing possible failure modes.
Figure 2B:
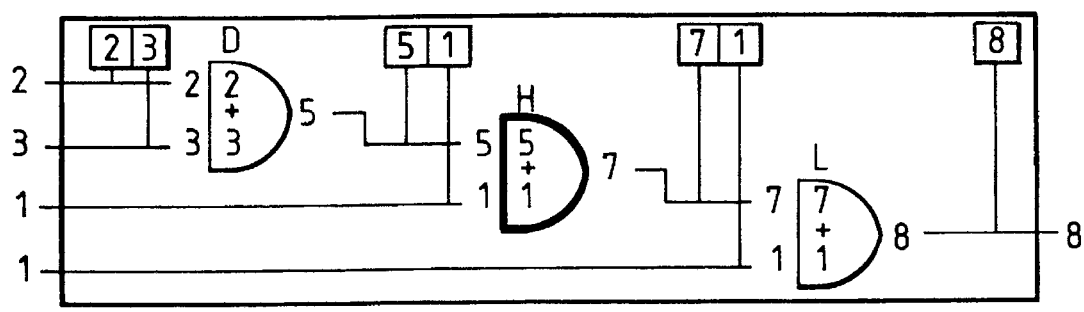
Figure 2C:
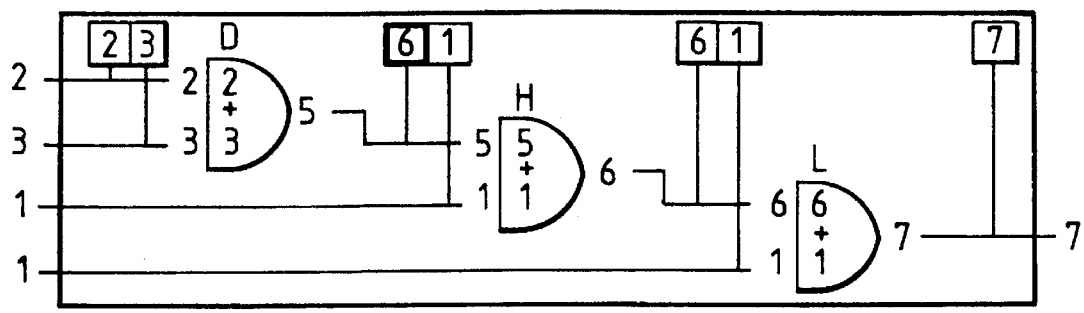

Referring now to FIG. 2(*a*), this shows a more detailed schematic of a correctly functioning single lane of such a simple logic computing system in which data values flow from left to right. At stage A, the data values input to the system from external sources and at B there is a store recording the two values input to one of the processors 2 or 3. At C there is shown the values actually input to the processor 2 or 3. At D there is shown the processor 2, 3 performing its logic function which is to add the two inputs and produce the resulting output at E. F is a store recording the inputs to the next processor, which includes the output E. At G are the actual values input to the next processor. At H is shown that next processor's function, again to add the inputs and produce the resultant output shown at I. At J is the record of the next processor's input, which includes output I. At K there is the next processor's actual inputs. At L is shown the next function, again to add and produce the resultant output at M. At N is the record of that output, and at O the final output of the system.

FIG. 2(*b*) shows the same system demonstrating a fault in the processor H by which the addition of input values 5+1 is falsely output as value 7.

FIG. 2(*c*) again shows the same system, this time with all processors correctly functioning, but with the store F incorrectly recording output value 5 from the processor D as value 6.

Figure 3A:
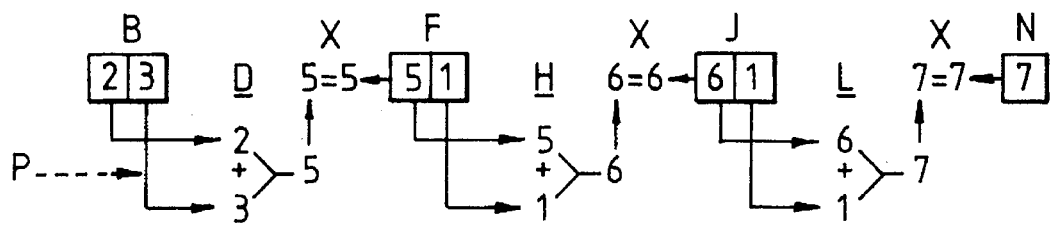
FIGS. 3(a) 3(b) and 3(c) are diagrammatic representations of a simulation program analyzing the failures of FIG. 2.
Figure 3B:
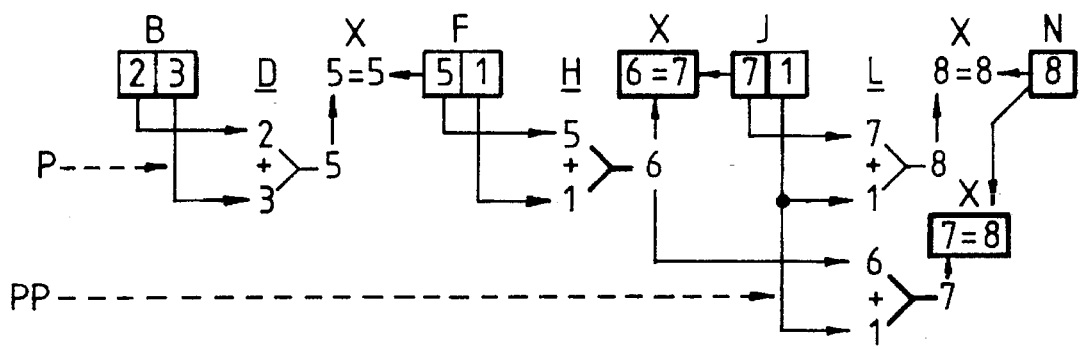
Figure 3C:
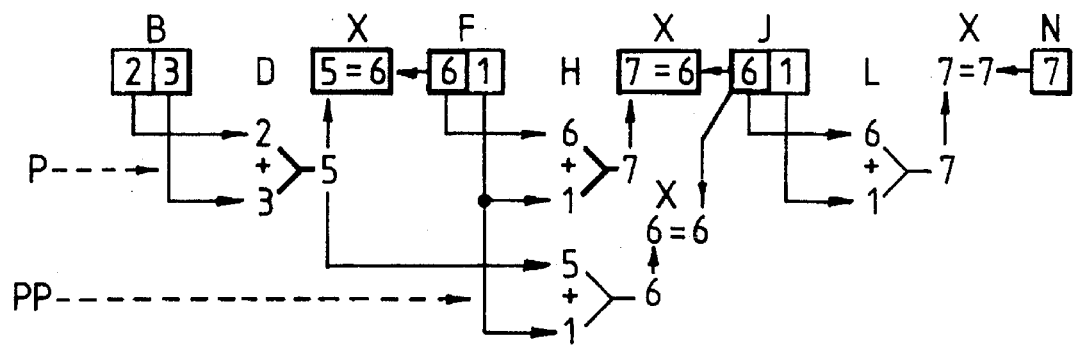

FIG. 3(*a*) shows diagrammatically the software simulation of a correctly functioning system corresponding to FIG. 2(*a*) in accordance with the invention where, in program steps marked P, values 2 and 3 from the store B recorded from the real system are input to equation D. This equation mimics the function of the processor D in the real system, adds the inputs, supplies the output value 5 and compares this output in a comparator X with the recorded output value 5 from the real system store F. The comparison is found to be correct and the simulation continues to extract the values from the store F, to mimic the function H, to compare the output with the stored value in J using comparator X, and to find agreement. The simulation uses the recorded values J to mimic function L, to compare its output with recorded value N and to conclude the real system to be functioning correctly.

FIG. 3(*b*) shows the software simulation corresponding to condition 2(*b*) of the real system where in program steps P the simulation process validates processor means D as functioning correctly. However, on mimicking function H, the simulation produces the value 6 by the addition of 5+1, whereas the real system's recorded output for the same function from store J is found to be 7. The simulation processor then completes the processing chain by using the recorded outputs from J (values 7 and 1) to mimic function L, producing the addition value 8, which correctly compares in comparator X with the value 8 recorded as the output of L in store means N. The simulator then runs its alternative program, signified PP, which employs its own calculated output value 6 for the function H to deduce that the value output by L should have been 6+1=7. This yields a mismatch with the stored value recorded in N proving that the processor H in the real system is not functioning correctly, because on examining a single processing element of the real system discrepancies have arisen in both programs P and PP.

FIG. 3(*c*) shows the alternative software simulation corresponding to FIG. 2(*c*) where store values B are taken from the real system and passed through step D to mimic the function of processor D. This produces the value result that 2+3=5 which comparator X finds to be at variance with the real system's output value 6 recorded in store F. The simulator completes the next step of the processing chain using real values F to mimic the function H, producing the value result that 6+1=7 which again differs from the real system's output value 6 recorded in store J. The simulator then runs its alternative program PP using its own calculated output value 5 for function D. This produces the result 5+1=6 in agreement with J, and concludes that, because both discrepancies have arisen in the same program P, the store F was at fault and had recorded a wrong value. The simulator then continues its simulation through step L producing a result which confirms the correct functioning of the real system being tested.

Figure 4A:
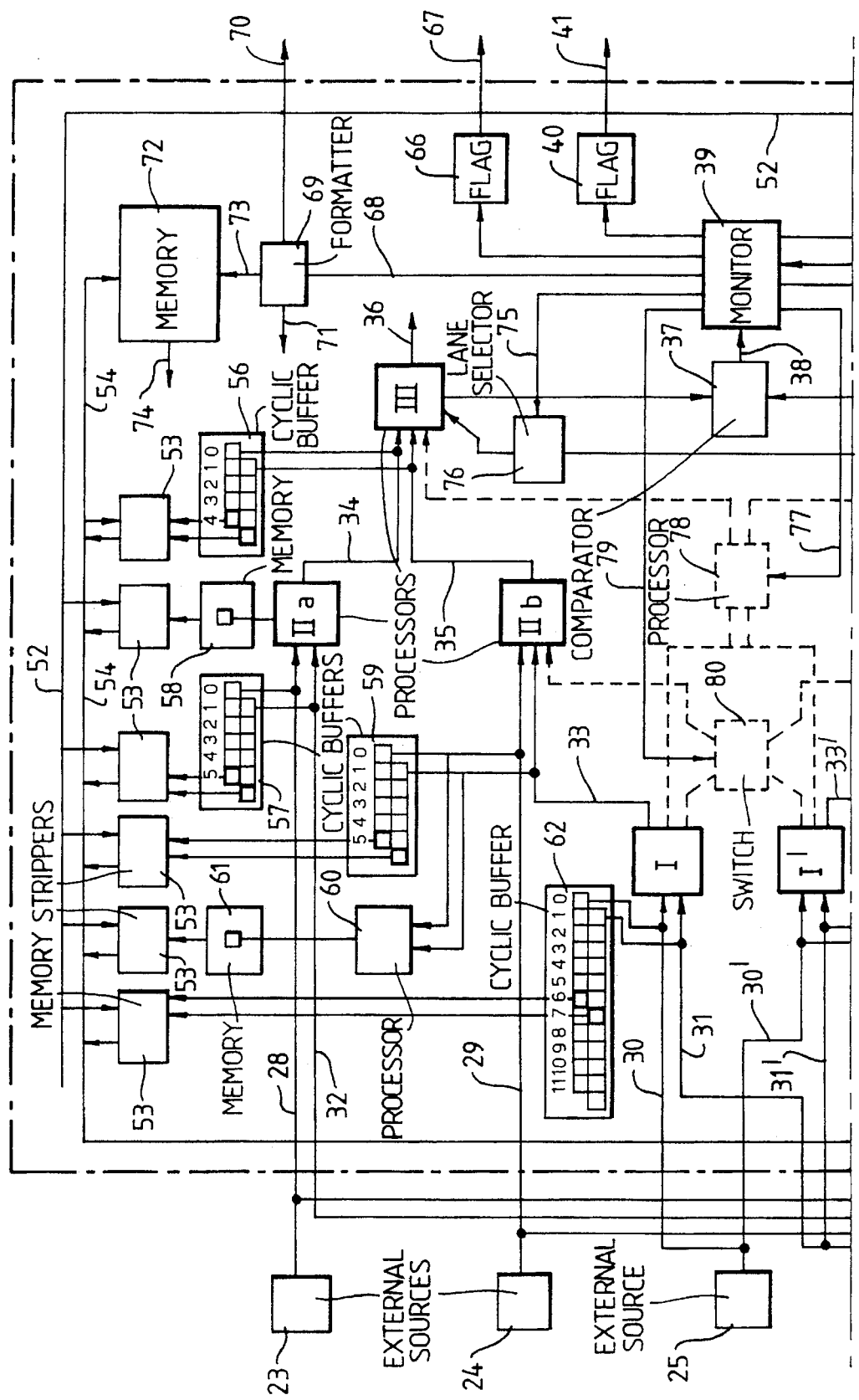
FIGS. 4(a) and 4(b), hereinafter collectively referred to as FIG. 4 is a schematic representation of the computing system showing the invention in greater detail.
Figure 4B:
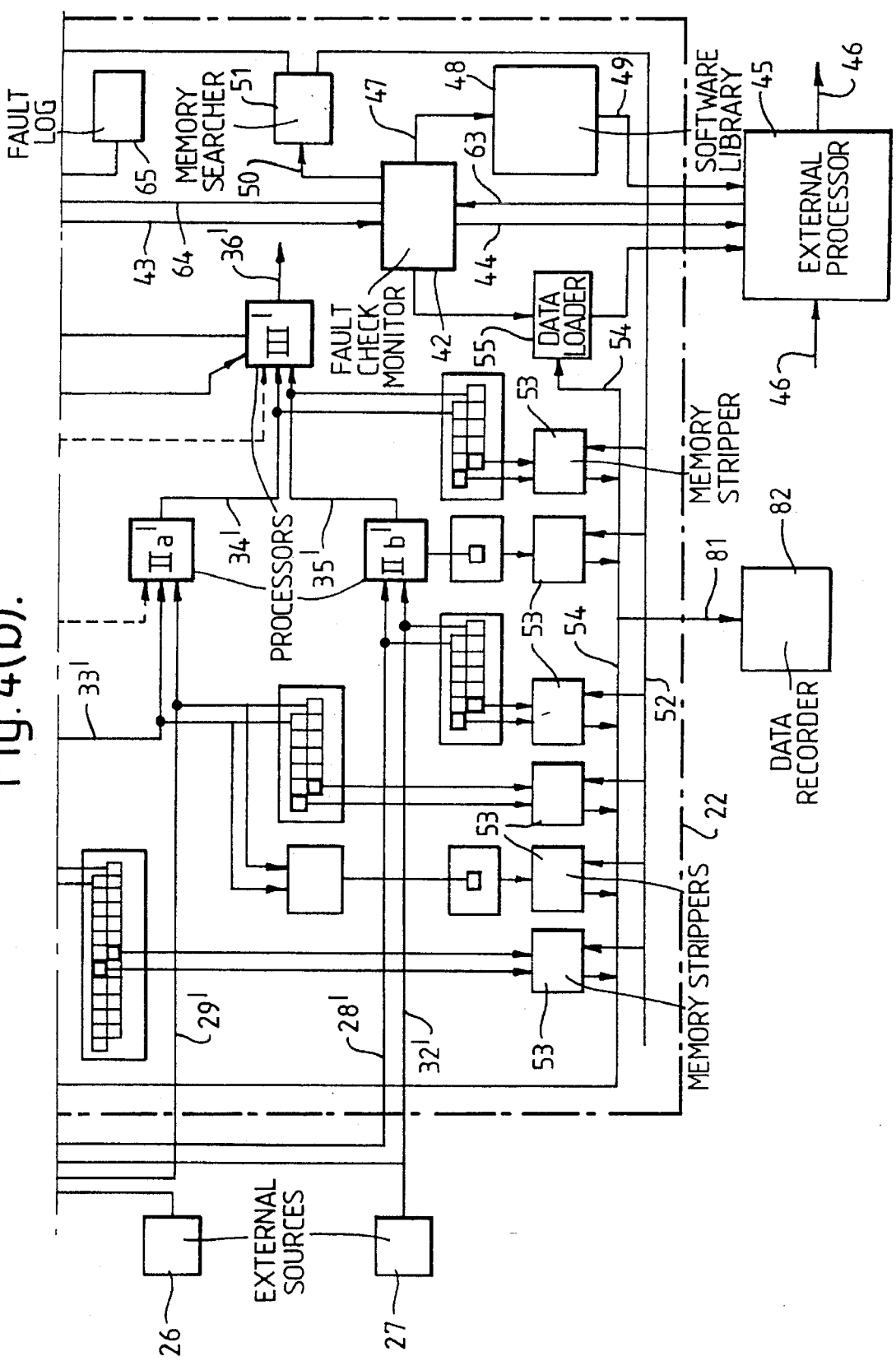

FIG. 4 shows an implementation of the invention in a dual-lane computing system delineated by system boundary 22. Each lane of the system employs three stages of calculation signified by processors I, II and III such that data enters the system from external sources 23, 24, 25, 26 and 27 via lines 28, 29, 30, 31 and 32 to the first lane, and via lines 28', 29', 30', 31' and 32' to the second (prime) lane. The data is employed unmodified by processors I, II*a*, I' and II*a*'; and in conjunction with the outputs of the processors I and I' via lines 33 and 33' by processors II*b* and II*b*'. The outputs of the processors II*a* and II*b* are employed via lines 34 and 35 by a processor III. The outputs of the processors II*a*' and II*b*' are employed via lines 34' and 35' by a processor III' to produce the system's final outputs via lines 36 and 36' which will be identical when the system is operating correctly. The calculations performed by the processors are not shown.

The final outputs 36 and 36' from the two lanes are compared by a comparator 37. On detection of a discrepancy, the comparator 37 passes an alert via line 38 to a system executive or monitor 39 which initiates fault-finding processing in accordance with the invention.

Referring only to the upper of the two identical lanes shown, each function described is mirrored in the lower (prime) lane.

Data bits passing through the system move from one processor to the next once per clock-cycle of the system as broadcast by a system clock (not shown). On receipt of an alert that a discrepancy has been detected, the monitor 39 sets a warning flag 40 announcing externally via line 41 that the system is under fault investigation, and commands a fault check monitor 42 via line 43 to execute a simulation check of the system. The fault check manager 42 issues a stop command to the processing elements of the system (via lines not shown) receipt of which marks the moment at which dataflows in the system are arrested as clock-cycle zero. It will be seen that, counting backwards from clock-cycle zero, the fault check manager 42 issued its stop command at clock-cycle one and the monitor 39 issued its check command at clock-cycle two. The comparator 38 issued its alert at clock-cycle three and the causal discrepancy, if arising in processor means III, would have occurred at clock-cycle four. If the discrepancy arose in processor means II*a* or II*b* it would have occurred at clock-cycle five, whereas if the discrepancy were in processor means I it would have occurred at clock-cycle six.

Fault check manager 42 issues a command via line 44 to an external processor 45 to interrupt its current processing task (signified by data flow 46). The manager 42 also supplies a command via line 47 to software library 48 to load software via line 49 to the processor 45 by which that processor may simulate the functions of the suspect computing system. A command is also supplied via line 50 to a memory searcher 51 to provide, to the processor 45, the data which had been entering each of the suspect computing system's processor elements at the moment the discrepancy could have arisen, that is, just prior to detection of the discrepancy.

The memory searcher 51 issues instructions via a memory search bus 52 to memory strippers 53 to download the needed data via memory dump bus 54 to memory data loader 55 and thence to the processor 45, as required for its execution of a simulation of the suspect system.

The memory strippers 53 extract the data bits needed from the memory cyclic buffers associated with the input lines to each of the computing system's processors.

For the processor III, a cyclic buffer 56 stores input data entering its associated processor for four clock-cycles, the memory stripper 53 extracting bits which entered the processor via lines 34 and 35 at clock-cycle four.

For the processor IIa, a cyclic buffer 57 stores input data arriving via lines 28 and 32 for five clock-cycles, of which the memory stripper 53 extracts the bits which arrived at clock-cycle five. The processor IIa also embodies a latching function which separately outputs a state signal to a memory 58 and which is similarly extracted by the memory stripper 53.

For the processor IIb, a cyclic buffer 59 records input data arriving via lines 29 and 33, the bits which arrived again at clock-cycle five being extracted by the memory stripper 53. The processor 11b similarly embodies a latching function but offers no separate output which reports that state. A separate processor 60 is, therefore, provided input data from lines 29 and 33 to replicate the latching calculation of the processor IIb and to output to a memory 61 an analogue of that state which is accessed by the memory stripper 53.

For the processor means I, a cyclic buffer 62 stores input data arriving via lines 30 and 31. The memory stripper 53 extracts bits which arrived at clock-cycle six, but cyclic buffer 62 is shown with capacity to record more extensive histories of data arrivals in the event analytical processes or recording histories greater than would be necessary for simple simulation of the moment the discrepancy arose are required. This may be the case where restart histories are required or later data is received while the system has been under test.

The processor 45 performs a simulation of both lanes of the suspect computing system using the data provided and reports its analysis via line 63 to the fault check manager 42 which in turn reports the status of the system and the identity of any components found to be at fault via line 64 to the monitor 39.

According to the rules applicable to the computing system, the monitor 39 may, if a fault is confirmed, record the details of that fault in fault log 65 and set a system fail flag 66 to report the failure externally via line 67. Alternatively, the monitor 39 may instruct the system to resume operation employing only its demonstrably functioning lane, or it may instruct the system to resume operation employing the external processor 45 in place of the detected failed component.

Where system rules permit the resumption of computing, the monitor 39 issues commands via line 68 to re, configuration formatter 69. The formatter 69 issues an appropriate restart alert via line 70 to external recipients of the system's data and issues initialization instructions to the system's processing elements via line 71. The formatter 69 also commands a restart time-frame memory 72 via line 73 to issue to the system's processing elements, via line 74, the data necessary to restart operations as at the original moment of arrest, which data is continuously provided to and stored by the restart time-frame memory at each clock-cycle of the system via the memory dump bus 54.

A satisfactory system restart may necessitate a complete or time-sampled history of the data which would have entered the system during the period when it was inactive under test. This data may be extracted by the re, configuration formatter 69 from input data memories configured as memory means 62.

Where system rules prescribe the disconnection of any lane containing a faulty component, the monitor 39 issues a command via line 75 to lane selector 76 to isolate the lane which includes the identified faulty component.

Where standby redundant components are incorporated within the system's architecture, the monitor 39 may command their activation to replace any identified faulty component such as, by way of example, a command issued via line 77 to a standby processor 78 to replace either of the faulty processors IIb or IIb' within the system (partially indicated by dashed lines).

Where the system rules allow relaxation of the system's lane separation criteria, the monitor 39 may issue a command via line 79 to a lane switch 80. This may for example, occur where one of the system's first stage processors has been identified as faulty, allowing the output of the surviving one of the processors I or I' to be duplicated both to its own lane and to the second stage processor means IIb or IIb' of the adjacent lane (indicated by dashed lines). By this means, first stage processing for both lanes may be performed by whichever of the processors I or I' has been found to be still functioning correctly, and both lanes may resume operation using that correctly functioning processor's output. Under these circumstances, the processor 45 may be retained to execute continuous simulation checks on the single remaining correctly functioning first stage processor, in order to maintain the duality of the system's original two-lane computing architecture.

For the purposes of recording the system's operation, the dataflows entering each processing element of the system are continuously passed via line 81 to data recorder 82 for long term retention.

The processing elements being tested by the invention may be of any size such that, by way of example, each may comprise a line replaceable module of a large electronic system, or alternatively each may comprise a single electronic component on a circuit board of such a line replaceable module, or each may constitute a functional element within a single solid-state device on such a circuit board.

The processing media employed may be electronic, photonic, analogue or digital, or a combination of any of these or of any other medium appropriate to the generation of computational effects.

In the case of an aircraft, the computing system protected in accordance with the invention may be a flight-critical system such as the computers associated with the aircraft's cockpit instrument display system, while the simulation processor means called upon to test the display system computers may be an especially provided processing device dedicated to such a testing function, but would preferably be the processing element of another existing non-flight-critical system aboard the aircraft such as may be a data storage system, a communications management system, or a cabin entertainment system. Such non-flight-critical computing devices are usually available in profusion aboard an aircraft, thus enabling potentially large numbers of failures to be tolerated, tests run and any system restarted to be functioning correctly with continuing restored multi-lane redundancy.

What I claim is:

1. A computing system comprising: two lanes, each lane having at least one processing means, the lanes being arranged to produce respective, nominally-identical outputs; means for supplying input data to each lane; means for detecting a discrepancy between said outputs and signalling a fault; store means associated with each said processing means, said store means being arranged to store input data supplied to its respective processing means and to re-inject input data to its respective processing means if the system should be restarted following an interruption to the system; simulator means for simulating operation of said processing means of one of the lanes on detection of a discrepancy between the outputs from said lanes; means for supplying the simulator means with said input data stored in said store means of one of the lanes which was supplied to its associated processing means just prior to the detection of a discrepancy, said simulator means being arranged to simulate the operation of the processing means of said one lane utilizing the data from said store means supplied to the store means just prior to detection of the discrepancy; and means for comparing an output of the simulator means with the outputs of the lanes produced on detection of the discrepancy so as thereby to identify which of said lanes is a malfunctioning lane.

2. A computing system comprising: two lanes, each lane having at least one processing means, the lanes being arranged to produce respective, nominally-identical outputs; means for supplying input data to each lane; means for detecting a discrepancy between said outputs and signalling a fault; store means associated with each said processing means, said store means being arranged to store input data supplied to its respective processing means; simulator means for simulating operation of said processing means of one of the lanes on detection of a discrepancy between the outputs from said lanes; means for supplying the simulator means with said input data stored in said store means of one of the lanes which was supplied to its associated processing means just prior to the detection of a discrepancy, said simulator means being arranged to simulate the operation of the processing means of said one lane utilizing the data from said store means supplied to the store means just prior to detection of the discrepancy; means for comparing an output of the simulator means with the outputs of the lanes produced on detection of the discrepancy so as thereby to identify which of said lanes is a malfunctioning lane; a software store of software simulating the operation of the lanes, the software store being separate from the simulator means, and means for loading the contents of the software store into the simulator means only on detection of a discrepancy between the two lane outputs.

3. A computing system comprising: two lanes, each lane having at least two processing means, the lanes being arranged to produce respective, nominally-identical outputs; means for supplying input data to each lane; means for detecting a discrepancy between said outputs and signalling a fault; store means associated respectively with each said processing means, each of said store means being arranged to store input data supplied to its respective processing means; simulator means for simulating operation of said processing means of one of the lanes on detection of a discrepancy between the outputs from said lanes; means for supplying the simulator means with said input data stored in said store means of one of the lanes which was supplied to its associated processing means just prior to the detection of a discrepancy, said simulator means being arranged to simulate the operation of the processing means of said one lane utilizing the data from said store means supplied to the store means just prior to detection of the discrepancy; and means for comparing an output of the simulator means with the outputs of the lanes produced on detection of the discrepancy so as thereby to identify which of said lanes is a malfunctioning lane; the simulator means being operative to simulate operation of a first of the processing means in a lane and supply an output to a second of the processing means in that lane instead of the output from said first processing means on detection of a fault in the first processing means.

4. A computing system according to claim 1, wherein the simulator means is also arranged to simulate operation of the second of the processing means.

5. A computing system according to claim 4, wherein the simulator means is arranged to perform two simulations of the second processing means one of which utilizes the output from the first processing means and the other of which utilizes the output produced by simulation of the first processing means.

* * * * *